(12) United States Patent
Walsh et al.

(10) Patent No.: US 6,541,148 B1
(45) Date of Patent: Apr. 1, 2003

(54) MANIFOLD SYSTEM FOR A FUEL CELL STACK

(75) Inventors: Michael M. Walsh, Fairfield, CT (US);
James H. Kralick, Albany, NY (US);
Daniel F. Woolley, Albany, NY (US)

(73) Assignee: Plug Power Inc., Latham, NY (US)

( * ) Notice: Subject to any disclaimer, the term of this patent is extended or adjusted under 35 U.S.C. 154(b) by 102 days.

(21) Appl. No.: 09/703,249

(22) Filed: Oct. 31, 2000

(51) Int. Cl.⁷ ................................................ H01M 8/04
(52) U.S. Cl. ............................ 429/39; 429/34; 429/35; 429/38
(58) Field of Search ............................... 429/37, 34, 38, 429/35, 36, 39

(56) References Cited

U.S. PATENT DOCUMENTS

| 5,486,428 | A | * | 1/1996 | Gardner et al. | ........... 429/34 X |
| 6,372,372 | B1 | * | 4/2002 | D'Aleo et al. | ................ 429/34 |
| 6,403,247 | B1 | * | 6/2002 | Guthrie et al. | ................ 429/34 |

* cited by examiner

*Primary Examiner*—John S. Maples
(74) *Attorney, Agent, or Firm*—Trop, Pruner & Hu, P.C.

(57) ABSTRACT

A fuel cell system includes a fuel cell stack, a manifold and a hinge. The manifold forms a sealed interface to communicate reactants with the stack, and the hinge forms a pivotable connection between the stack and the manifold. The fuel cell system also includes at least one gas/water separator that is disposed in the manifold to collect water from one of the flows.

11 Claims, 11 Drawing Sheets

MANIFOLD SYSTEM FOR A FUEL CELL STACK

BACKGROUND

The invention generally relates to a manifold system for a fuel cell stack.

A fuel cell is an electrochemical device that converts chemical energy produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

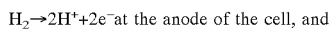

$H_2 \rightarrow 2H^+ + 2e^-$ at the anode of the cell, and

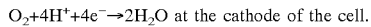

$O_2 + 4H^+ + 4e^- \rightarrow 2H_2O$ at the cathode of the cell.

Because a single fuel cell typically produces a relatively small voltage (around 1 volt, for example), several fuel cells may be formed out of an arrangement called a fuel cell stack to produce a higher voltage. The fuel cell stack may include plates (graphite composite or metal plates, as examples) that are stacked one on top of the other, and each plate may be associated with more than one fuel cell of the stack. The plates may include various channels and orifices to, as examples, route the reactants and products through the fuel cell stack. Several PEMs (each one being associated with a particular fuel cell) may be dispersed throughout the stack between the anodes and cathodes of the different fuel cells.

Certain openings of the plates of the stack typically are aligned for purposes of forming passageways for communicating reactants and coolant throughout the stack. Connections must be made between these passageways of the stack and various conduits of the system. For example, the passageway of the stack that is associated with the fuel that is supplied to the stack needs to be connected to a fuel input line that communicates fuel from a fuel processor. These connections between the stack passageways and the conduits of the fuel cell system may consume a significant part of the time needed to assemble the fuel cell system, and this assembly time may directly affect the overall cost of the fuel cell system.

Thus, there is a continuing need for an arrangement that addresses one or more of the problems that are stated above.

SUMMARY

In an embodiment of the invention, a fuel cell system includes a fuel cell stack, a manifold and a hinge. The manifold forms a sealed interface to communicate reactants with the stack, and the hinge forms a pivotable connection between the stack and the manifold.

In another embodiments of the invention, a fuel cell system includes a fuel cell stack, a manifold and a separator (a gas/water separator, for example). The manifold communicates flows with the stack, and the separator is disposed in the manifold to collect water from one of the flows.

Advantages and other features of the invention will become apparent from the following description, from the drawing and from the claims.

DETAILED DESCRIPTION

Figure 1:
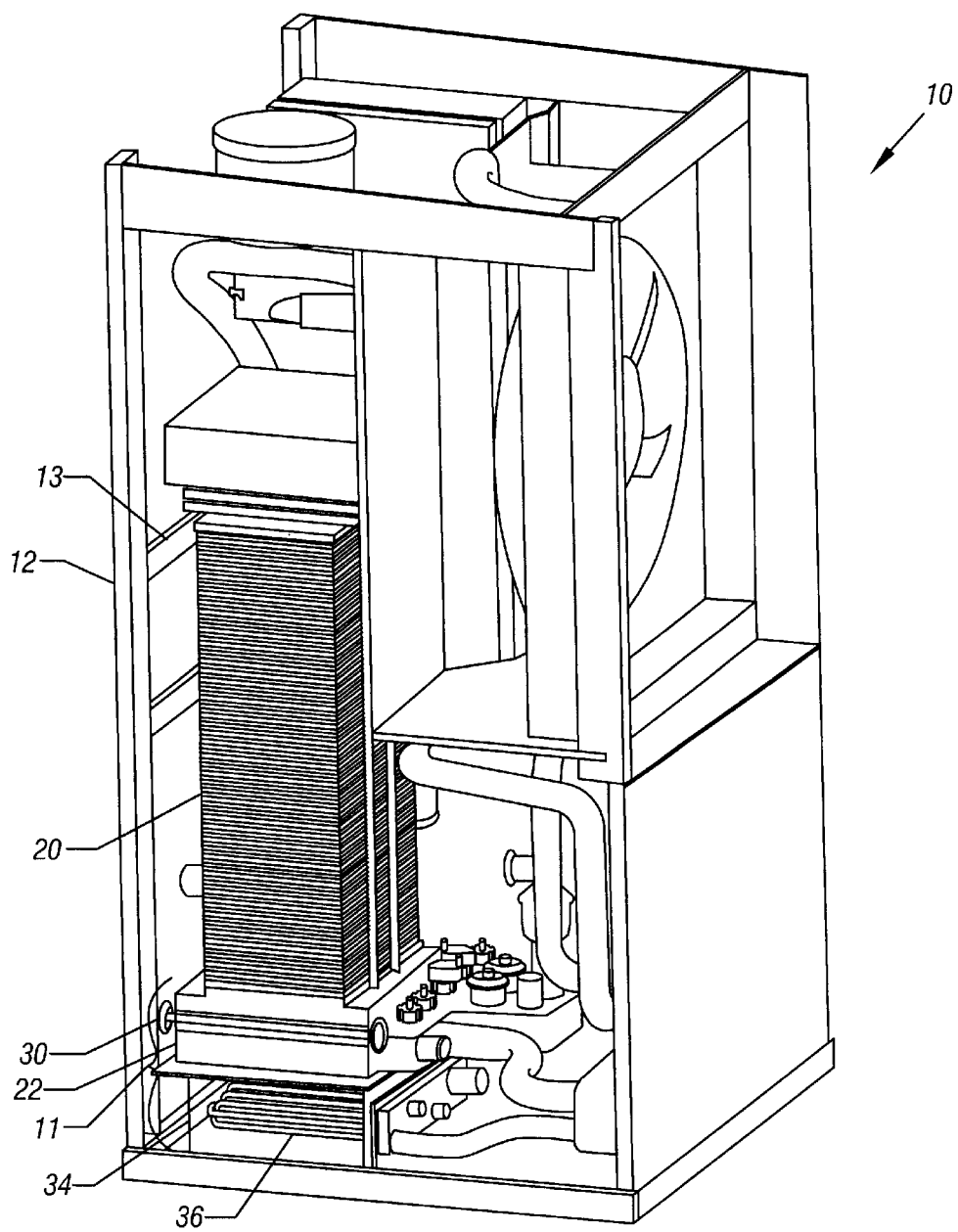
FIG. 1 is a perspective view of a fuel cell system according to an embodiment of the invention.

Referring to FIG. 1, an embodiment 10 of a fuel cell system in accordance with the invention includes a fuel cell stack 20 (a PEM stack, for example) that produces power for a load (a residential load, for example) in response to fuel (hydrogen, for example) and oxidant flows that are received by the stack 20. In this manner, the stack 20 includes flow plates that have aligned openings to form passageways to receive the incoming fuel and oxidant flows and route these flows to appropriate anode and cathode regions of the stack 20. Besides creating the passageways for the incoming fuel and oxidant flows, the flow plates of the stack 20 also have openings that align to form passageways for communicating outgoing fuel and oxidant flows that were not consumed in the fuel cell reactions inside the stack 20. The flow 20 plates may form additional passageways, such as passageways to communicate coolant in and out of the stack 20, for example.

For purposes of communicating the reactants and coolant between the stack 20 and the remaining components (a fuel processor, an air blower, an oxidizer, etc.) of the fuel cell system 10, the fuel cell system 10 includes a manifold system 11 that has several advantages over conventional manifold arrangements. For example, as described below, the manifold system 11 may be quickly assembled to the stack 20 and quickly disassembled from the stack 20. Furthermore, the manifold system 11 provides better thermal and water management than conventional manifold arrangements.

In this manner, in some embodiments of the invention, the manifold system 11 uses a one piece structure called a manifold, or manifold housing 22, that has various chambers to establish communication between the reactant and coolant passageways of the stack and the reactant and coolant conduits of the system 10. The manifold housing 22 may be formed from a single piece of material, such as a plastic, a metal or a composite material, as just a few examples. As examples, milling or injection molding may be used to form the manifold housing 22 from the selected material. By consolidating the manifold connections of the fuel cell system 10 into the one piece manifold housing 22, convective heat losses may be reduced, as compared to conventional fuel cell systems.

The manifold system 11, in some embodiments of the invention, improves water management by consolidating the collected water condensate in the system 10 into a single water tank 34 (of the manifold system 11), thereby concentrating this collected water into one location where the water may be thawed in the event that the fuel cell system 10 experiences freezing temperatures. In this manner, as described below, the water tank 34 collects condensate from gas/water separators (not shown in FIG. 1) that are located in the manifold housing 22, and a heat exchanger 36 of the manifold system 11 is capable of delivering the necessary heat to thaw any frozen water in the water tank 34. As an example, the heat exchanger 36 may transfer heat from the flare of a fuel processor during startup of the fuel cell system 10. As described below, each gas/water separator, in some embodiments of the invention, may extend partially into the water tank 34 to permit thawing of any frozen water in the separator.

As described below, the manifold system 11 may have many additional features, such features that permit instrumentation probes to be mounted in the manifold housing 22, thereby eliminating the need to remove the instrumentations probes if the stack 20 is replaced. As another example, the manifold system 11 may form a releasable hinge connection with the stack 20 to permit accurate and quick assembly of the stack 20 onto the manifold system 11 and into a frame 12 of the fuel cell system 10.

Figure 2:
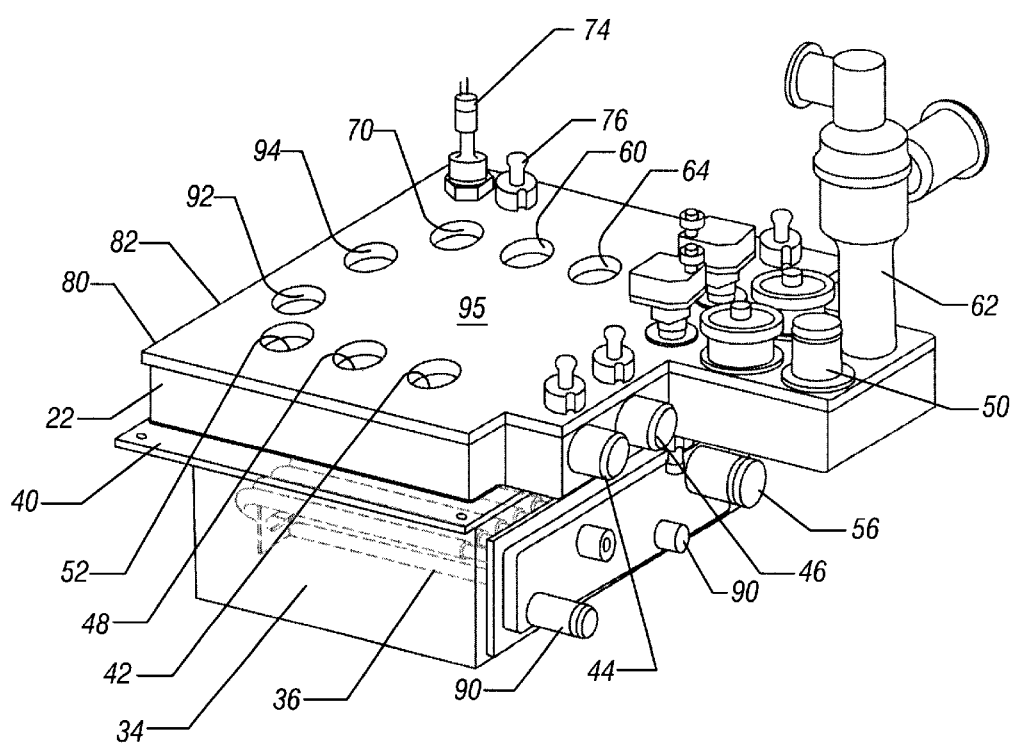
FIG. 2 is a perspective view of a manifold system of the fuel cell system according to an embodiment of the invention.
Figure 3:
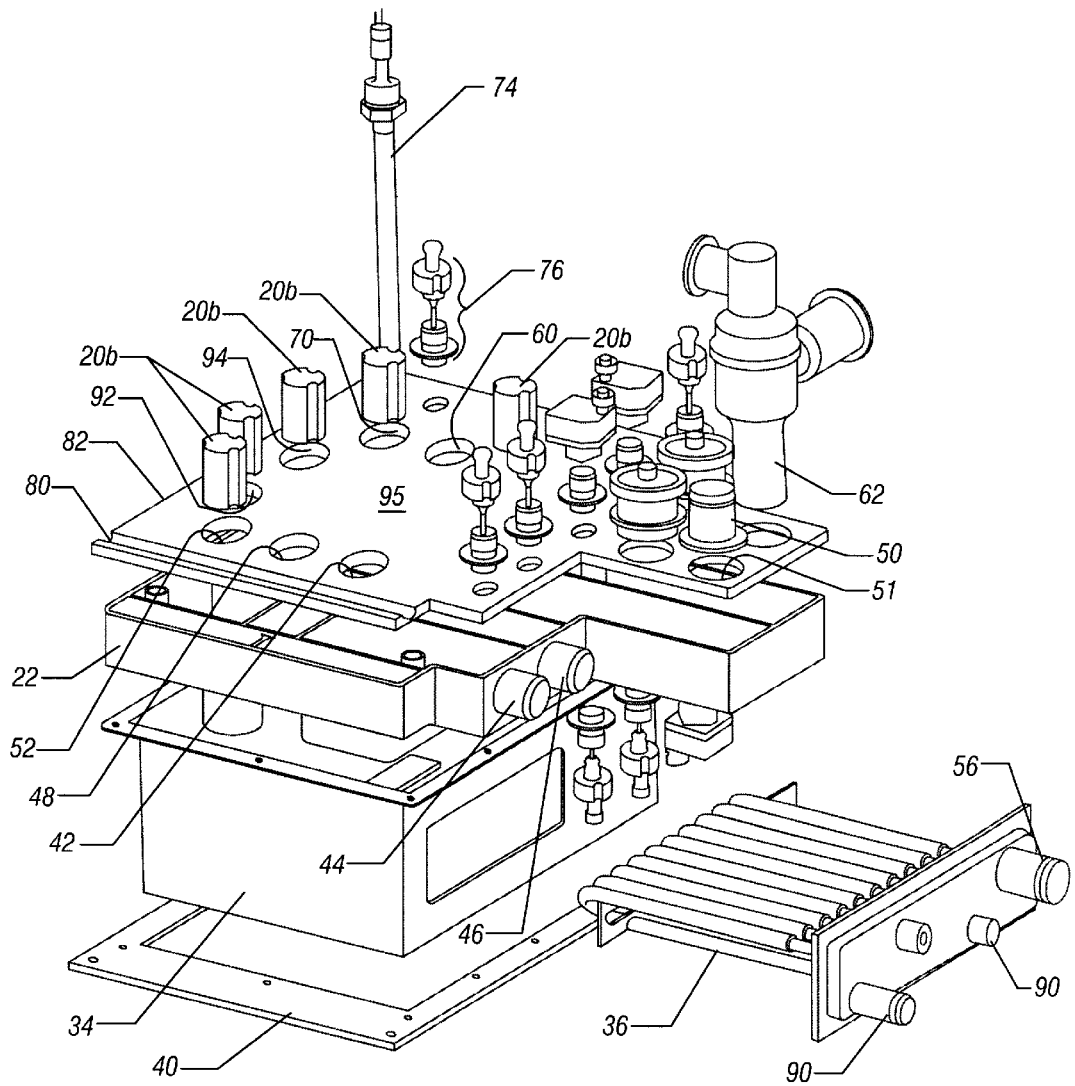
FIG. 3 is an exploded perspective view of the manifold system of the fuel cell system according to an embodiment of the invention.

To illustrate at least some of those features, FIGS. 2 and 3 depict a more detailed perspective view of the manifold system 11. As shown, the manifold system 11 includes a flat gasket 82 that is sandwiched between the flat bottom surface of the stack 20 and the upper relatively flat upper surface of the manifold housing 22 to seal off the regions between the stack 22 and the manifold system 11 associated with the fuel, oxidant and coolant flows. Thus, the upper flat surface 95 of the gasket 82 contacts the bottom surface of the stack 20, as described below. The gasket 82 includes openings 42, 48 and 52 for receiving outlet oxidant, coolant and fuel flows, respectively, from passageways of the stack 20. Chambers (described below) of the manifold housing 22 route these oxidant, coolant and fuel flows to respective fuel 50, coolant 46 and oxidant 44 outlet ports of the manifold housing 22 where conduits may be connected to communicate these flows to various parts of the system 10.

The gasket 82 also includes openings 70, 60 and 64 for delivering oxidant, coolant and fuel flows to the stack 20. These openings receive the oxidant, coolant and fuel flows from chambers (of the manifold housing 22) that receive oxidant, coolant and fuel flows from respective fuel 62, coolant 56 and oxidant (not shown in FIG. 2) inlet ports of the manifold housing 22. These inlet ports receive these flows from a fuel processor (not shown), coolant system (not shown) and air blower (not shown) that are connected to the ports via various system conduits.

In other embodiments of the invention, the gasket 82 may be replaced by separate sealing rings, each of which seals off a particular coolant, oxidant or fuel opening. Other variations are possible.

Among the other features of the manifold system 11, in some embodiments of the invention, a gasket 40 (see FIG. 2) forms a seal between the manifold housing 22 and the water tank 34. In this manner, water that is collected by gas/water separators that are disposed inside the manifold housing 22 accumulates in the reservoir formed by the water tank 34. The manifold system 11 also includes instrumentation probes, such as instrumentation probes 74 and 76, that are mounted to the gasket 82 and may be used to take measurements (temperature and/or pressure measurements, as examples) of flows in the manifold housing 22 and the water in the tank 34, as a few examples.

As described in more detail below, in some embodiments of the invention, the manifold housing 22 includes a groove 80 and ridges 81 (see FIG. 4) that form a female part of the hinge 30 (see FIG. 1) that pivotably connects the stack 20 to the manifold housing 22. In this manner, the groove 30 is located near and extends along an outer edge of the gasket 82 to receive a male axis portion (of the hinge 30) that is part of the stack 20, as described below. The ridges 81 are spaced apart and located between the groove 80 and the adjacent outer edge of the gasket 82. Each ridge 81 is curved to approximate the curvature of the axis of the hinge 30. As described further below, when the stack 20 is placed on the manifold housing 22, the ridges 81 are sufficiently resilient to flex slightly away from the groove 80 to permit the groove 80 to receive the axis of the hinge 30. After insertion of the axis into the groove 80, the ridges return to their non-flexed positions to hold the axis in the groove 80 to form the assembled hinge 30.

Figure 4:
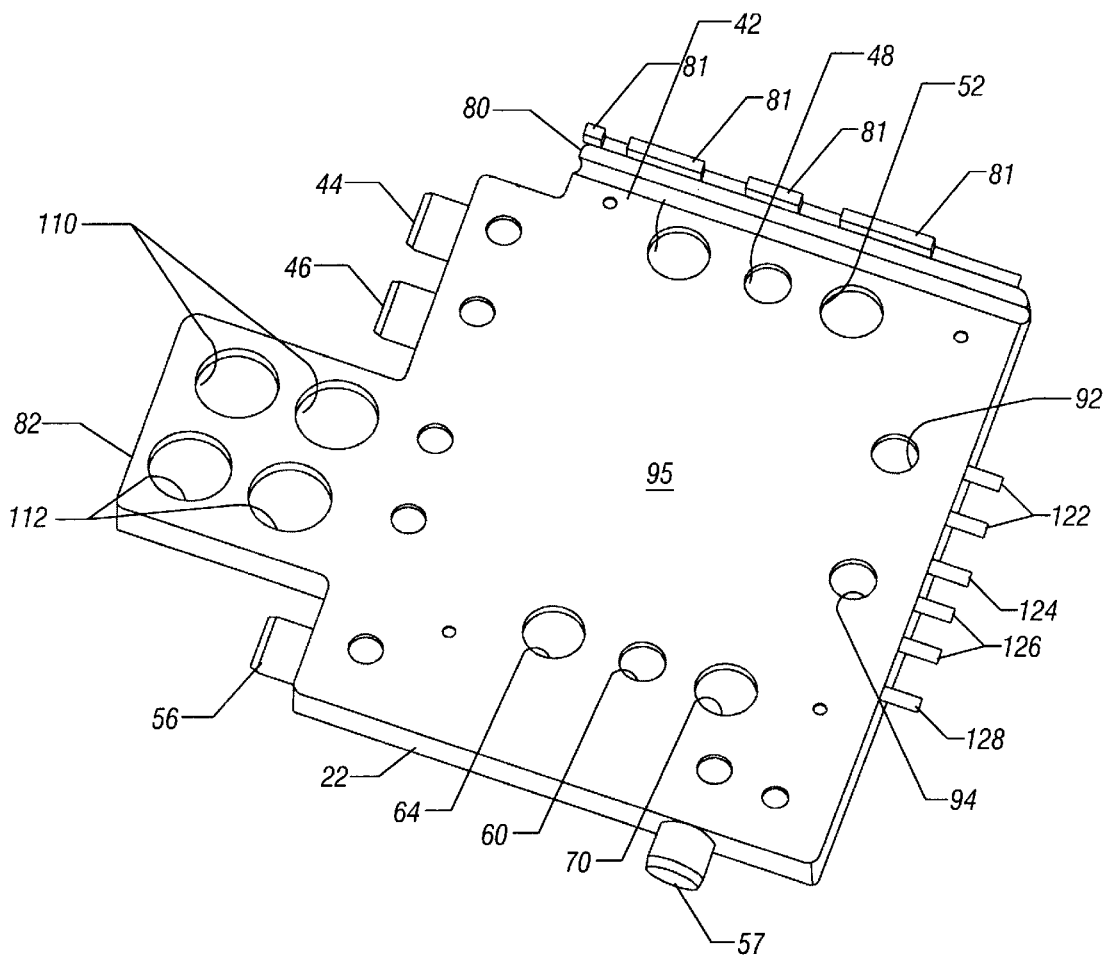
FIG. 4 is a top view of a gasket and manifold housing of the manifold system according to an embodiment of the invention.
Figure 5:
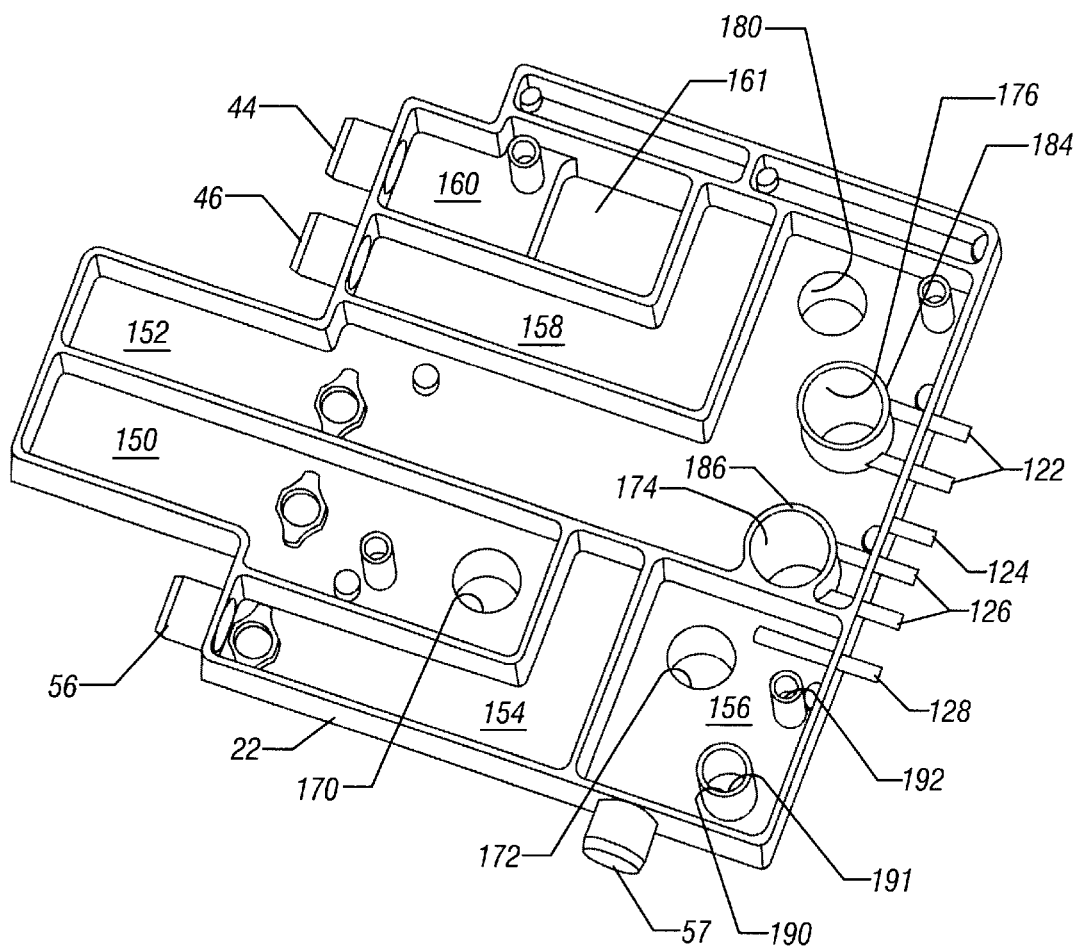
FIG. 5 is a top view of the manifold housing according to an embodiment of the invention.

Referring to FIGS. 4 and 5, in some embodiments of the invention, the above-described openings in the gasket 82 establish communication between chambers of the manifold housing 22 and the passageways of the stack 20. Each chamber is formed by vertical partition walls of the manifold housing 22 and the bottom of the manifold housing 22, and the top of each chamber is formed and sealed off by the gasket 82. For example, the coolant outlet port 46 of the manifold housing 22 and the coolant opening 48 of the gasket 82 are both in communication with an L-shaped chamber 158 (see FIG. 5) of the manifold housing 22. Similarly, the oxidant outlet port 44 of the manifold housing 22 and the coolant opening 42 of the gasket 82 are both in communication with a chamber 160 of the manifold housing 22; and fuel outlet ports 110 of the manifold housing 22 and the fuel opening 52 of the gasket 82 are all in communication with an L-shaped chamber 152 of the manifold housing 22. For the inlet ports of the manifold housing 22, an oxidant inlet port 57 of the manifold housing 22 and the oxidant opening 70 of the gasket 82 are both in communication with a chamber 156 of the manifold housing 22; a coolant inlet port 56 of the manifold housing 22 and a coolant opening 60 of the gasket 82 are both in communication with an L-shaped chamber 154 of the manifold housing 22; and the openings 64 and 112 of the gasket 82 are all in communication with a chamber 150 of the manifold housing 22.

Also depicted in FIG. 5 are wells that are formed in the manifold housing 22 for purposes of forming gas/water separators in the manifold housing 22. In this manner, the wells form the bottoms and sidewalls of the gas/water separators. As an example, the inlet fuel chamber 150 includes a cylindrical well 170 that forms part of a gas/water separator to remove water from the incoming fuel stream, as described below. The inlet oxidant chamber 156 also includes a cylindrical well 172 that forms part of a gas/water separator to remove water from the incoming oxidant stream; and the outlet fuel chamber 152 includes a cylindrical well 180 that forms part of a gas/water separator to remove water from the outgoing fuel stream.

In some embodiments of the invention, the manifold housing 22 forms part of gas/water separators that, instead of removing water from flows that are communicated from the manifold housing 22 to the stack 20, remove water from other flows that are communicated to the manifold housing 22 from various parts of the system 10. In this manner, the manifold housing 22 includes wells 174 and 176 that form parts of gas/water separators that remove water from flows that are communicated to the wells 174 and 176 through conduits 122 (for the well 176) and 126 (for the well 174) from other parts of the fuel cell system 10. Thus, unlike the other gas/water separators, the wells 174 and 176 are not in communication with the flows inside the manifold housing 22 that are directly communicated with the stack 10. Instead, the gas/water separator that includes the well 174 includes a cylindrical sidewall 186 that is surrounded by the chamber 152 and isolates the well 174 from the chamber 152. In this manner, the sidewall 186 extends upwardly from the bottom of the manifold housing 22 to form a seal with the gasket 82. The gas/water separator that includes the well 176 also includes a cylindrical sidewall 184 that is also surrounded by the chamber 152 and isolates the well 176 from the chamber 152. The sidewall 184 extends upwardly from the bottom of the manifold housing 22 to form a seal with the gasket 82.

Among the other features of the manifold housing 22, the housing 22 may include an opening 191 to receive the instrumentation probe 74 that extends through the bottom of the manifold housing 22 into the water tank 34 to measure a temperature of the water in the tank 34, for example. The opening 191 is surrounded by a cylindrical sidewall 190 that isolates the opening 191 from the chamber 156 and extends upwardly from the bottom of the manifold housing 22 to form a seal with the gasket 82. The manifold housing 22 may also include other chambers in which instrumentation probes may be inserted to measure a property of a flow while remaining isolated from the flow. For example, the manifold housing 22 may include a cylindrical wall 192 that isolates the instrumentation probe 76 from the chamber 156 and rises upwardly from the bottom of the manifold housing 22 to form a seal with the gasket 82.

Figure 6:
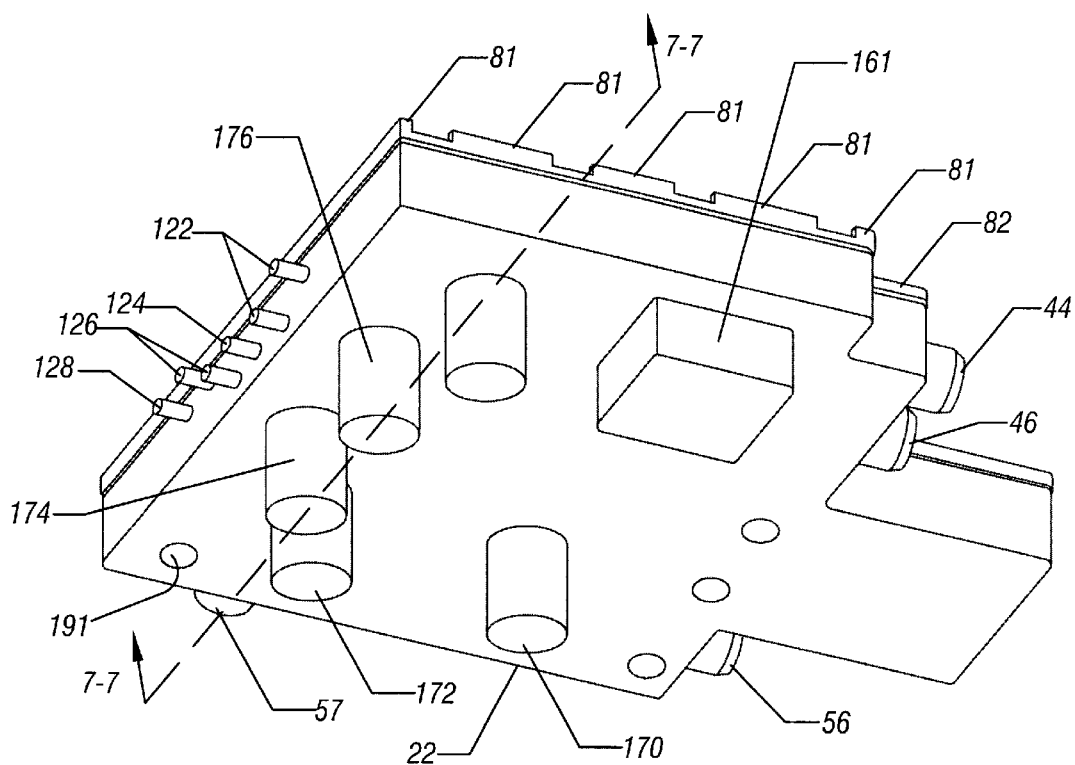
FIG. 6 is a bottom view of the manifold housing according to an embodiment of the invention.

Referring to FIG. 6 that depicts a bottom of the manifold housing 22, the wells 172, 174, 176 and 180 are designed to extend into the water tank 34 below the water level of the tank 34 for purposes of surrounding the wells 172, 174, 176 and 180 with the heated water in the tank 34 to prevent the water inside the wells from freezing. The manifold housing 22 may also include a box-shaped well 161 that is part of the oxidant outlet chamber 160 and extends below the water level of the water tank 34. Due to this arrangement, the heated oxidant flow from the stack 20 may be used to supply heat to the water tank 34.

Figure 7:
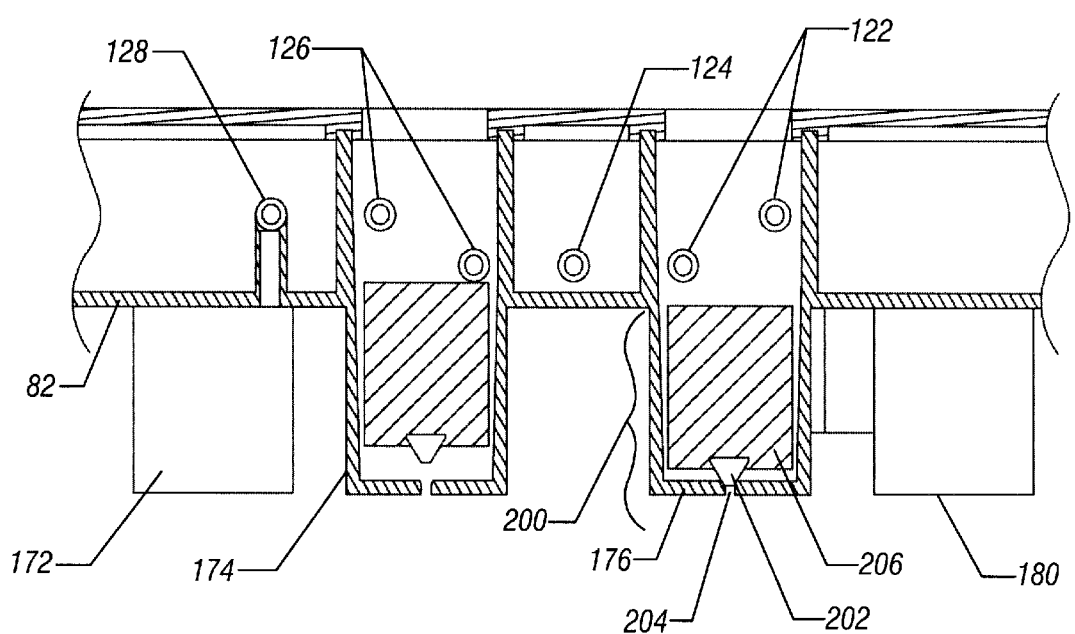
FIG. 7 is a cross-sectional view taken along line 7—7 of FIG. 6 according to an embodiment of the invention.

As noted above each gas/water separator is formed from one of the cylindrical wells in the manifold housing 22. An exemplary gas/water separator 200 that is formed from the well 176 is depicted in FIG. 7. As shown, the separator 200 includes a float 206 that resides inside the well 176 to regulate a level of collected water inside the well 176. In this manner, the separator 200 ensures that a sufficient level of water exists in the well 176 to prevent gas from entering the water tank 34. More specifically, the float 206 includes a molded elastomer grommet 202 that is designed to seat in an opening 204 (i.e., a valve seat) at the bottom of the well 176. When the level of accumulated water in the well 176 is below a sufficient level, the grommet 202 seats in the opening 204 to block communication between the well 176 and the water tank 34 for purposes of causing the water level inside the well 176 to rise. When the level of water in the well 176 rises above a sufficient level, the float 206 rises to lift the grommet 202 out of the opening 204 to permit water from the well 176 to flow into the water tank 34 until the water level in the well 176 decreases to the appropriate level.

Figure 8:
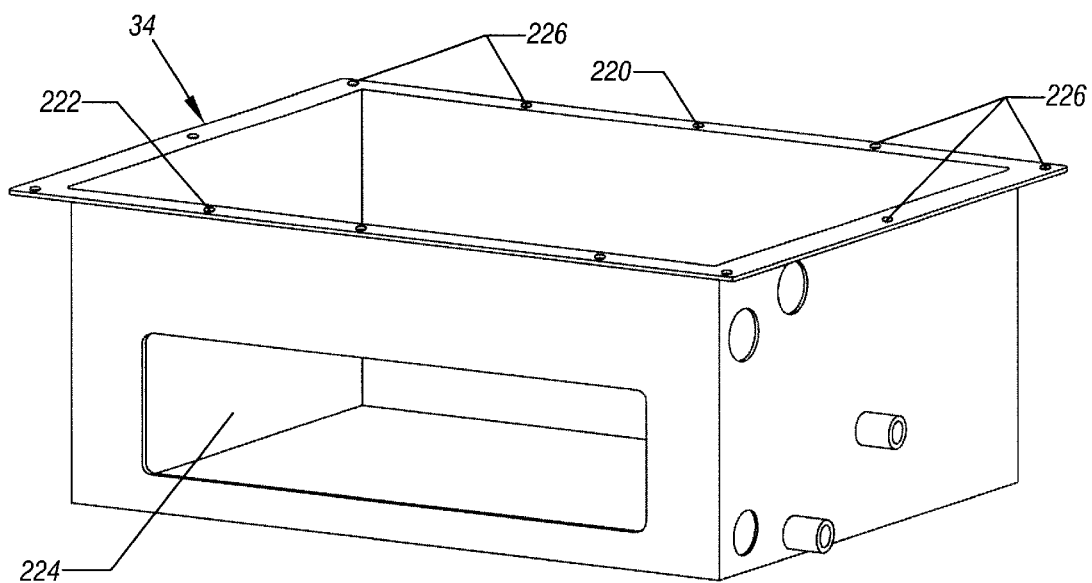
FIG. 8 is a perspective view of a water tank of the manifold system according to an embodiment of the invention.

Referring to FIG. 8, in some embodiments of the invention, the water tank 34 is generally box-shaped with an opening 222 at its top that establishes communication between the water tank 34 and the gas/water separators in the manifold housing 22. A flange 220 extends along the periphery of the opening 222, and the flange 220 includes holes 226 through which bolts may extend to connect the water tank 34 to the manifold housing 22. In some embodiments of the invention, the water tank 34 includes a recessed region 224 in one of its sidewalls to receive the heat exchanger 36.

Figure 9:
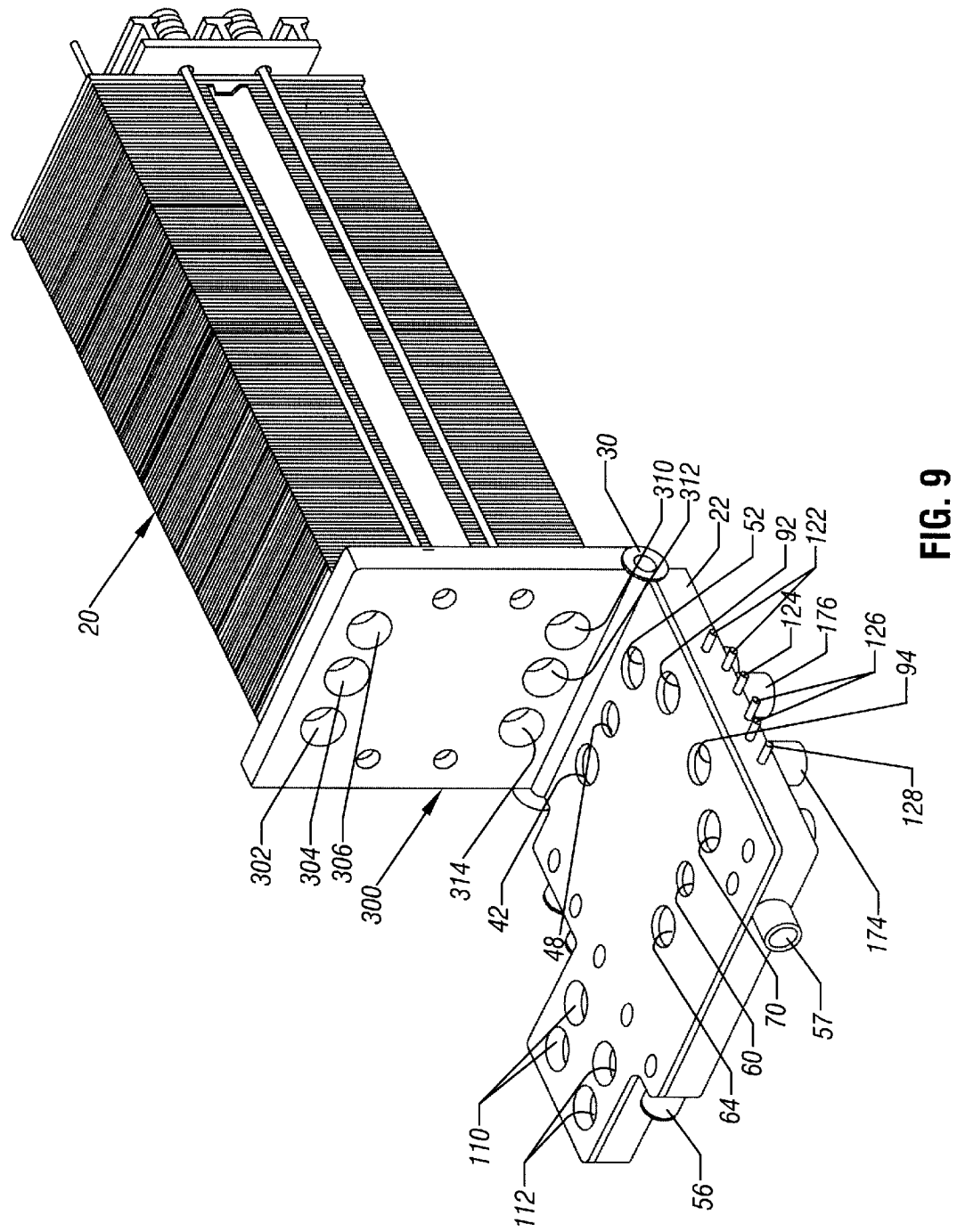
FIG. 9 is a perspective view of the fuel cell stack and the manifold system depicting operation of a hinge according to an embodiment of the invention.
Figure 10:
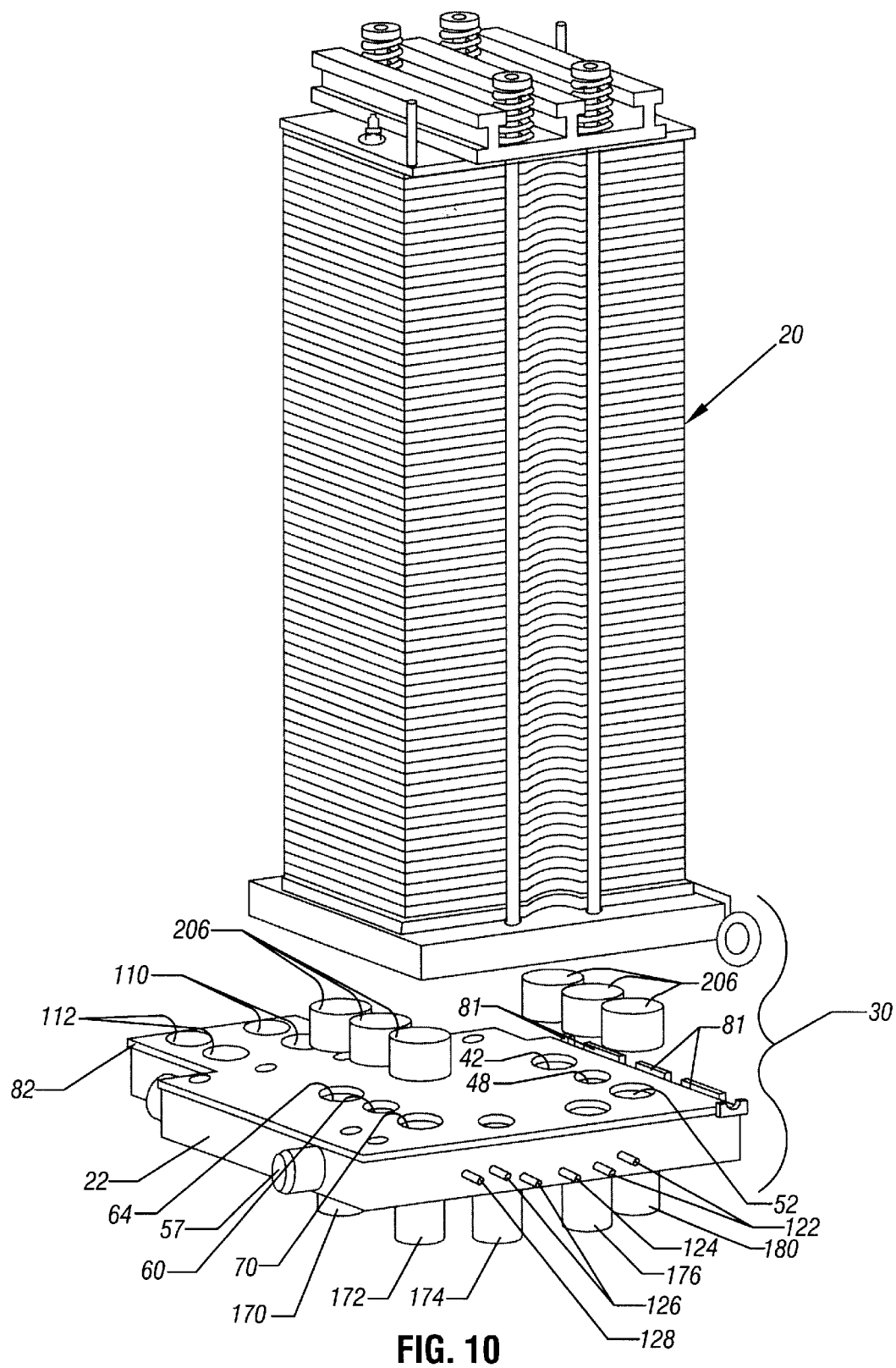
FIG. 10 is an exploded perspective view of the fuel cell stack and the manifold system according to an embodiment of the invention.

When the hinge 30 is assembled to mount the stack 20 to the manifold housing 22, the stack 20 may be rotated to a horizontal position, as depicted in FIG. 9. When the stack 20 is in the horizontal position, the gasket 82 (not depicted in FIG. 9) may be positioned on the upper surface of the manifold housing 22, and the floats 206 (see also FIG. 10) may be inserted into the wells to form the gas/water separators. Maintenance may also be performed on the stack 20 and manifold assembly 11 when the stack 20 is in the horizontal position.

Referring to FIG. 9, oxidant 302, coolant 304 and fuel 306 outlet openings of stack 20 align with the corresponding oxidant 64, coolant 60 and fuel 70 openings, respectively, of the gasket 82 when the stack 20 is rotated to a vertical position; and fuel 314, coolant 312 and oxidant 310 inlet openings of the stack 20 align with corresponding fuel 42, coolant 48 and oxidant 52 openings of the gasket 82 when the stack 20 is rotated to the vertical position.

Figure 11:
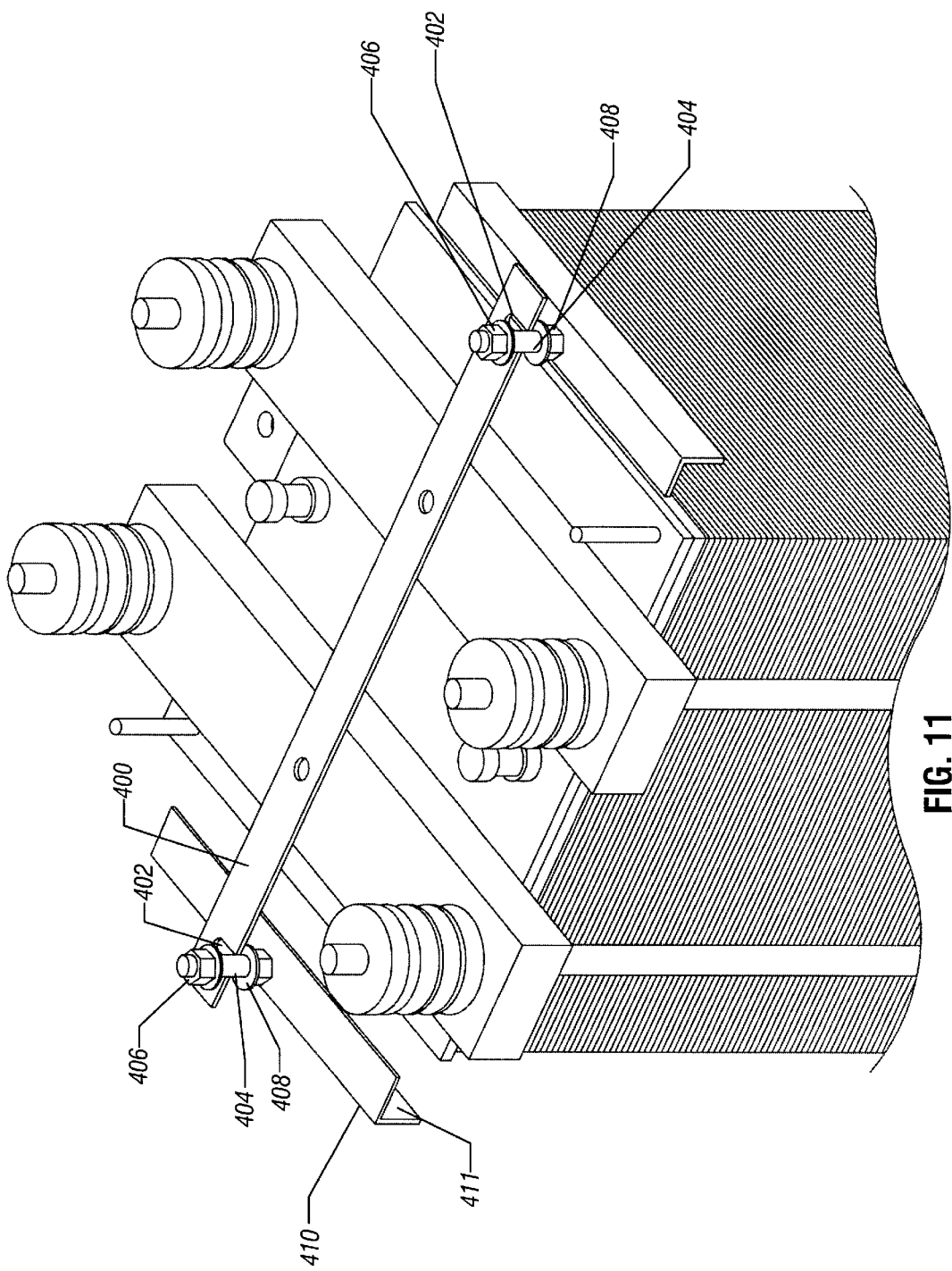
FIG. 11 is a perspective view of the stack and a connector to secure the stack to a frame of the fuel cell system according to an embodiment of the invention.

Referring to FIG. 11, the stack 20 may be rotated to the vertical position and secured to the frame 12 (see FIG. 1) after the manifold assembly 11 is mounted to the frame 12. In this manner, in some embodiments of the invention, the fuel cell system 10 may include a latching mechanism, or connector, to connect the stack 20 to the frame 12 when the stack 20 is rotated to the vertical position. The connector may include a leaf spring 400 that extends across and contacts the top of the stack 20. The resiliency of the spring 400 provides a force along the longitudinal axis of the stack 20 to compress the stack 20 against the manifold housing 22 and energize the seal that is formed by the gasket 82. Each end of the spring 400 includes a notch 402 to receive a vertical bolt 408 that is attached to the frame 12. In this manner, when the stack 20 is rotated to the vertical position, the notch 402 receives the bolt 404, and an upper locking nut 408 may be threaded onto the free end of each bolt 404 to secure the stack 20 to the frame 12. The bolt 404 extends through an angled frame member 410 that is secured to a horizontal member 13 (see FIG. 1) of the frame 12. The head of the bolt 404 is on a side of the frame member 410 opposite from the leaf spring 400. A lower locking nut 408 is threaded on the bolt 404 and is located between the leaf spring 400 and the frame member 410.

In the preceding description, directional terms, such as "upper," "lower," "vertical" and "horizontal," may have been used for reasons of convenience to describe the fuel cell system and its associated components. However, such orientations are not needed to practice the invention, and thus, other orientations are possible in other embodiments of the invention.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell system comprising:

a fuel cell stack;

a manifold to communicate flows with the stack; and a separator disposed in the manifold to collect water from one of the flows.

2. The system of claim 1, wherein the separator comprises:

a well disposed in the manifold, the bottom of the well including an orifice to release water from the well; and a plunger disposed in the well to control access to the orifice to regulate a water level in the well.

3. The system of claim 2, further comprising:

a water tank attached the manifold and adapted to collect water that flows through the orifice.

4. The system of claim 3, wherein the well extends into the water tank.

5. The system of claim 4, wherein the well is below a water level of the water tank.

6. The system of claim 2, wherein the well is integral with the manifold.

7. The system of claim 1, further comprising:

conduits to communicate another flow to the manifold, the manifold not directly communicating said another flow with the stack; and another separator disposed in the manifold to collect water from said another flow.

8. The system of claim 7, wherein said another separator comprises:

a well disposed in the manifold, the bottom of the well including an orifice to release water from the well; and a plunger disposed in the well to control access to the orifice to regulate a water level in the well.

9. The system of claim 8, further comprising:

a water tank attached the manifold and adapted to collect water that flows through the orifice.

10. The system of claim 1, further comprising:

a measurement probe located in the manifold.

11. The system of claim 1, further comprising:

a heat exchanger adapted to melt ice that forms in a water tank.

* * * * *

UNITED STATES PATENT AND TRADEMARK OFFICE
CERTIFICATE OF CORRECTION

PATENT NO. : 6,541,148 B1  
DATED : April 1, 2003  
INVENTOR(S) : Michael M. Walsh, James H. Kralick and Daniel F. Woolley It is certified that error appears in the above-identified patent and that said Letters Patent is hereby corrected as shown below:

Column 7,  
Line 22, after "attached" insert -- to --.

Column 8,  
Line 18, after "attached" insert -- to --.

Signed and Sealed this

Twenty-fourth Day of June, 2003

JAMES E. ROGAN  
*Director of the United States Patent and Trademark Office*